(12) United States Patent
Croak et al.

(10) Patent No.: US 7,599,357 B1
(45) Date of Patent: Oct. 6, 2009

(54) METHOD AND APPARATUS FOR DETECTING AND CORRECTING ELECTRICAL INTERFERENCE IN A CONFERENCE CALL

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 1020 days.

(21) Appl. No.: 11/011,256

(22) Filed: Dec. 14, 2004

(51) Int. Cl.
*H04L 12/66* (2006.01)

(52) U.S. Cl. .............. 370/352; 370/235; 370/260; 370/261; 370/267; 370/356; 379/202.01; 455/416; 704/215; 704/270.1; 709/204

(58) Field of Classification Search ............ 370/352, 370/235, 260, 261, 267, 356; 379/202.01; 455/406, 416; 704/215, 270.1
See application file for complete search history.

(56) References Cited

U.S. PATENT DOCUMENTS

| | | | | |
|---|---|---|---|---|
| 4,416,007 | A * | 11/1983 | Huizinga et al. | 370/267 |
| 4,797,876 | A * | 1/1989 | Ratcliff | 370/261 |
| 5,384,772 | A * | 1/1995 | Marshall | 370/235 |
| 5,436,896 | A * | 7/1995 | Anderson et al. | 370/260 |
| 5,530,699 | A * | 6/1996 | Kline | 370/260 |
| 5,724,416 | A * | 3/1998 | Foladare et al. | 379/202.01 |
| 5,898,676 | A * | 4/1999 | Apfelbeck et al. | 370/260 |
| 5,963,547 | A * | 10/1999 | O'Neil et al. | 370/260 |
| 6,262,979 | B1 * | 7/2001 | Anderson et al. | 370/267 |
| 6,463,414 | B1 * | 10/2002 | Su et al. | 704/270.1 |
| 6,662,211 | B1 * | 12/2003 | Weller | 709/204 |
| 6,697,614 | B2 * | 2/2004 | Dorenbosch | 455/416 |
| 6,731,609 | B1 * | 5/2004 | Hirni et al. | 370/260 |
| 6,792,092 | B1 * | 9/2004 | Michalewicz | 379/202.01 |
| 6,888,935 | B1 * | 5/2005 | Day | 379/202.01 |
| 6,999,920 | B1 * | 2/2006 | Matt et al. | 704/215 |
| 7,006,455 | B1 * | 2/2006 | Fandrianto et al. | 370/260 |
| 7,006,616 | B1 * | 2/2006 | Christofferson et al. | 379/202.01 |
| 7,215,663 | B1 * | 5/2007 | Radulovic | 370/356 |
| 7,349,352 | B2 * | 3/2008 | Vandermersch | 370/261 |
| 7,428,223 | B2 * | 9/2008 | Nierhaus et al. | 370/260 |
| 2002/0111153 | A1 * | 8/2002 | Hartmaier et al. | 455/406 |
| 2002/0118650 | A1 * | 8/2002 | Jagadeesan et al. | 370/260 |
| 2002/0167915 | A1 * | 11/2002 | Mills et al. | 370/260 |
| 2002/0172342 | A1 * | 11/2002 | O'Malley et al. | 379/202.01 |
| 2003/0002448 | A1 * | 1/2003 | Laursen et al. | 370/261 |
| 2003/0012148 | A1 * | 1/2003 | Peters | 370/260 |
| 2003/0063573 | A1 * | 4/2003 | Vandermersch | 370/260 |
| 2004/0064314 | A1 * | 4/2004 | Aubert et al. | 704/233 |
| 2004/0076277 | A1 * | 4/2004 | Kuusinen et al. | 379/202.01 |
| 2005/0185602 | A1 * | 8/2005 | Simard et al. | 370/260 |

\* cited by examiner

*Primary Examiner*—Gerald Gauthier

(57) ABSTRACT

The present invention enables a network to detect electrical interference caused by cellular phones and correct the problem by playing a network announcement to the network operator if the interference reaches a certain threshold level. In turn, the network operator will notify participants of the conference call of the interference and ask them to change the location of their cellular phones.

3 Claims, 4 Drawing Sheets

METHOD AND APPARATUS FOR DETECTING AND CORRECTING ELECTRICAL INTERFERENCE IN A CONFERENCE CALL

The present invention relates generally to communication networks and, more particularly, to a method and apparatus for detecting and correcting electrical interference in a conference call.

BACKGROUND OF THE INVENTION

Cellular phones placed near multi-user speakerphones in conference rooms can generate signals that can disrupt live conferences due to electrical interference. This occurs when call signaling messages are transmitted to the phone and are picked up by the conference bridge. This interference occurs when phones are either turned off or on, and can reach high enough levels to make conversation unintelligible.

Therefore, a need exists for a method and apparatus for detecting and correcting electrical interference in a conference call.

SUMMARY OF THE INVENTION

In one embodiment, the present invention enables a network to detect electrical interference caused by cellular phones and correct the problem by playing a network announcement to the network operator if the interference reaches a certain threshold level. In turn, the network operator will notify participants of the conference call of the interference and ask them to change the location of their cellular phones.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
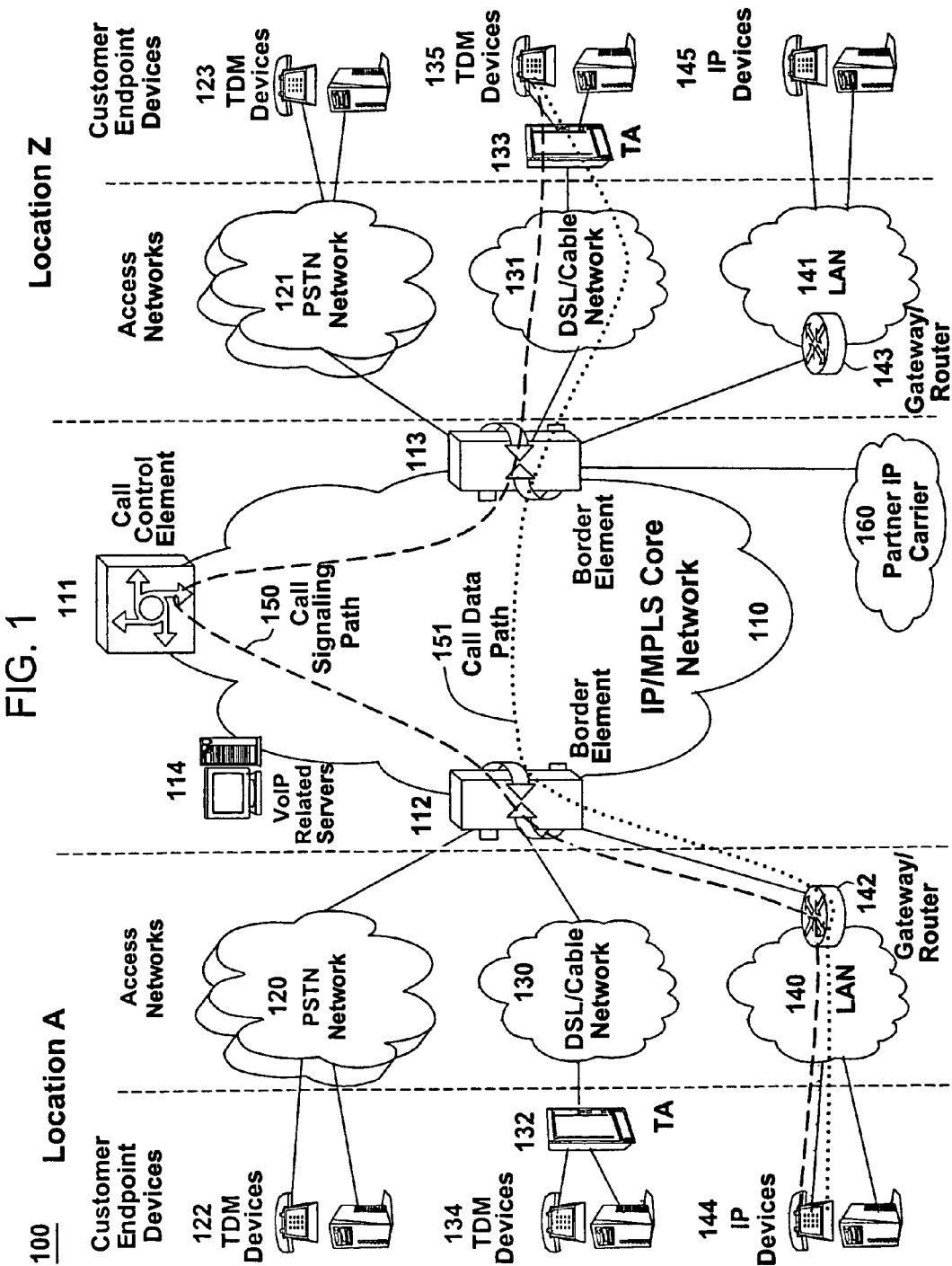
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Cellular phones placed near multi-user speakerphones in conference rooms can generate signals that can disrupt live conferences due to electrical interference. This occurs when call signaling messages are transmitted to the cellular phone and are picked up by the conference bridge. This interference occurs when cellular phones are either turned off or on, and can reach high enough levels to make conversation unintelligible.

To address this criticality, the present invention enables a network to detect electrical interference caused by cellular phones and correct the problem by playing a network announcement to the network operator if the interference reaches a certain threshold level. In turn, the network operator will notify participants of the conference call of the interference and ask them to change the location of their cellular phones.

Figure 2:
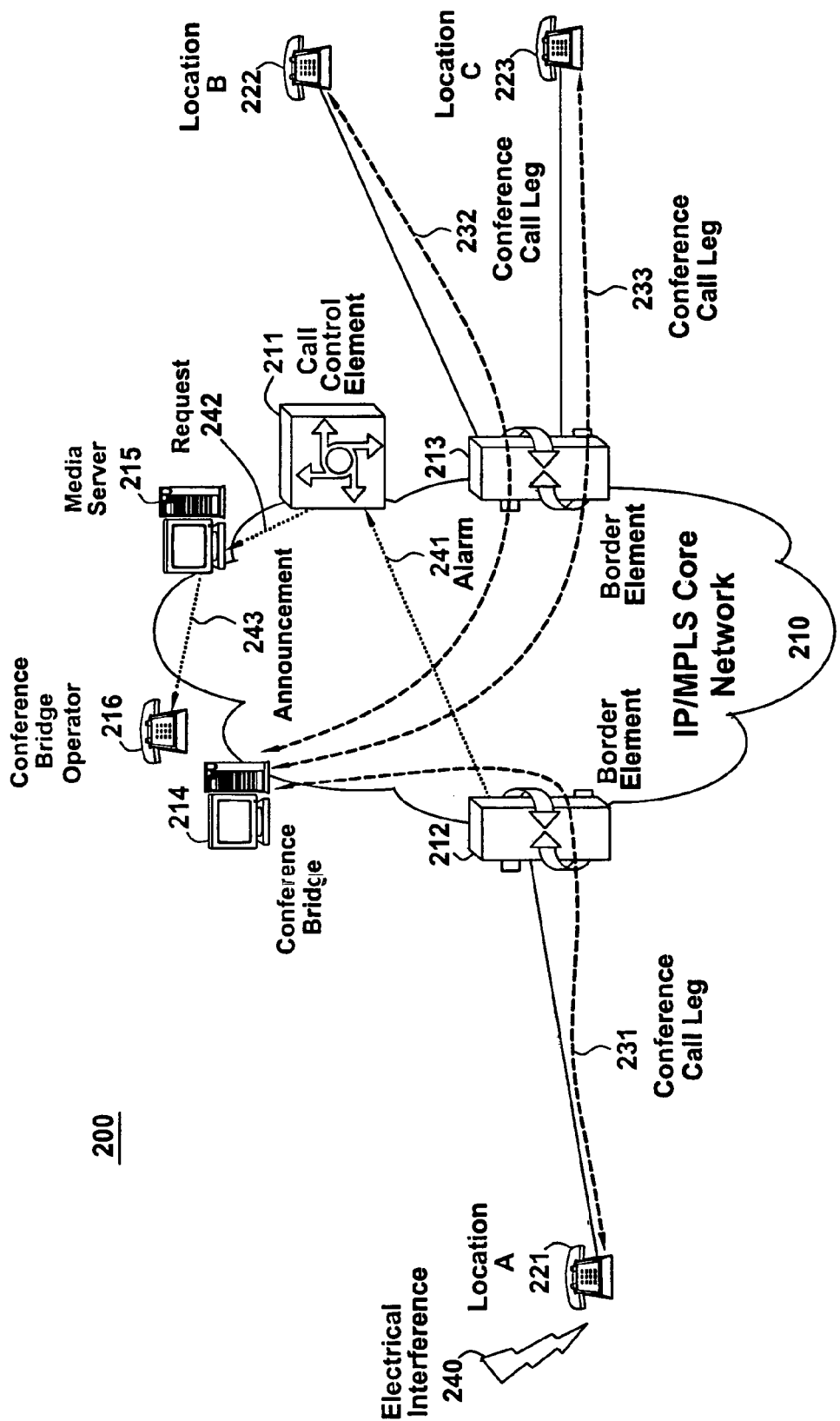
FIG. 2 illustrates an example of detecting and correcting electrical interference in a conference call of the present invention.

FIG. 2 illustrates an example of detecting and correcting electrical interference in a conference call. FIG. 2 shows a three party conference call, supported by Conference Bridge (CB) 214, in progress with conference call legs 231, 232, and 233 connecting locations A, B, and C respectively. Electrical interference 240 occurs when a wireless network sends signaling messages to a cellular phone placed nearby the speakerphone at location A. BE 212 continuously monitors the media stream of the conference call in progress and detects the electrical interference has exceeded the network operator preset threshold level. Any known method of detecting electrical interference in a media stream can be deployed in the present invention. For example, cellular phone electrical interference on a media stream can be measured in a controlled environment, e.g., setting up a conference bridge and then placing cell phone(s) near the speakerphone. The results are captured and analyzed, which can then be used to set the preset threshold level.

Once detected, BE 212 raises an alarm 241 in response to the electrical interference threshold having been exceeded and sends the alarm to CCE 211. CCE 211 receives the alarm 241 and sends a request 242 to Media Server (MS) 215 to relay a network announcement 243 to the conference operator 216 to report the electrical interference problem 240. In general, the Media Server (MS) is a special server that typically handles and terminates media streams, and to provide services such as announcements, bridges, transcoding, and Interactive Voice Response (IVR) messages. Even though the MS 215 and CB 214 are shown as two separate network elements in FIG. 2, the function of CB 214 can actually reside within MS 215 in one embodiment. MS 215 and CB 214 are listed separately for simplicity and clarity purposes. Once the network operator 216 receives the network announcement, the operator will interrupt the conference call in progress to inform the participants that a cellular phone is likely placed too close to a speakerphone and the cellular phone needs to be relocated.

Figure 3:
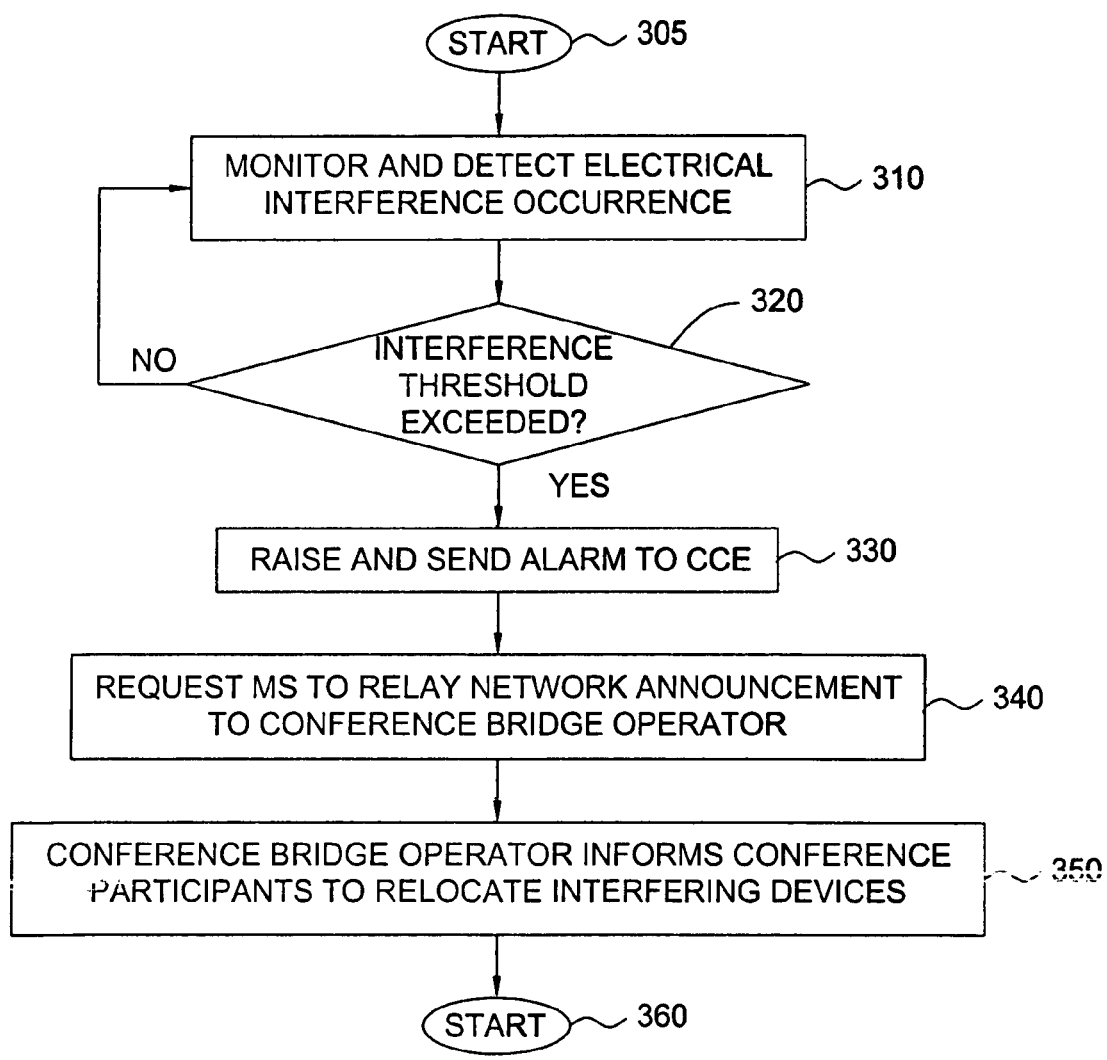
FIG. 3 illustrates a flowchart of a method for detecting and correcting electrical interference in a conference call of the present invention.

FIG. 3 illustrates a flowchart of a method for detecting and correcting electrical interference in a conference call. Method 300 starts in step 305 and proceeds to step 310.

In step 310, the method monitors the media stream to detect the occurrence of electrical interference caused by an interfering device such as a cellular phone. Any known method of detecting electrical interference in a media stream can be deployed in the present invention.

In step 320, the method checks if the detected interference has exceeded the network operator preset interference threshold level. If the threshold is exceeded, the method proceeds to step 330; otherwise, the method returns to step 310.

In step 330, the method raises and sends an alarm in response to the interference to the CCE. In one embodiment, the electrical interference is monitored and detected by a BE. The BE is also tasked with raising and sending the alarms.

In step 340, the method sends a request to the MS to send out a network announcement in response to the interference. In one embodiment, the network announcement request is sent by the CCE.

In step 350, the method sends a network announcement originated by the MS to the conference bridge operator to inform the operator of the electrical interference problem. In step 360, the network operator interrupts the conference calls to inform the participants that a cellular phone is likely placed too close to a speakerphone and the cellular phone needs to be relocated.

Alternatively, the present invention can be adapted such that the MS may automatically interrupt the conference call directly by presenting a network announcement or automated announcement, e.g., "Electrical interference has been detected, please relocate cell phones away from the speakerphone. Thank you.", and so on." This automated announcement alleviates the need for using a human operator to manually interrupt the conference call.

Figure 4:
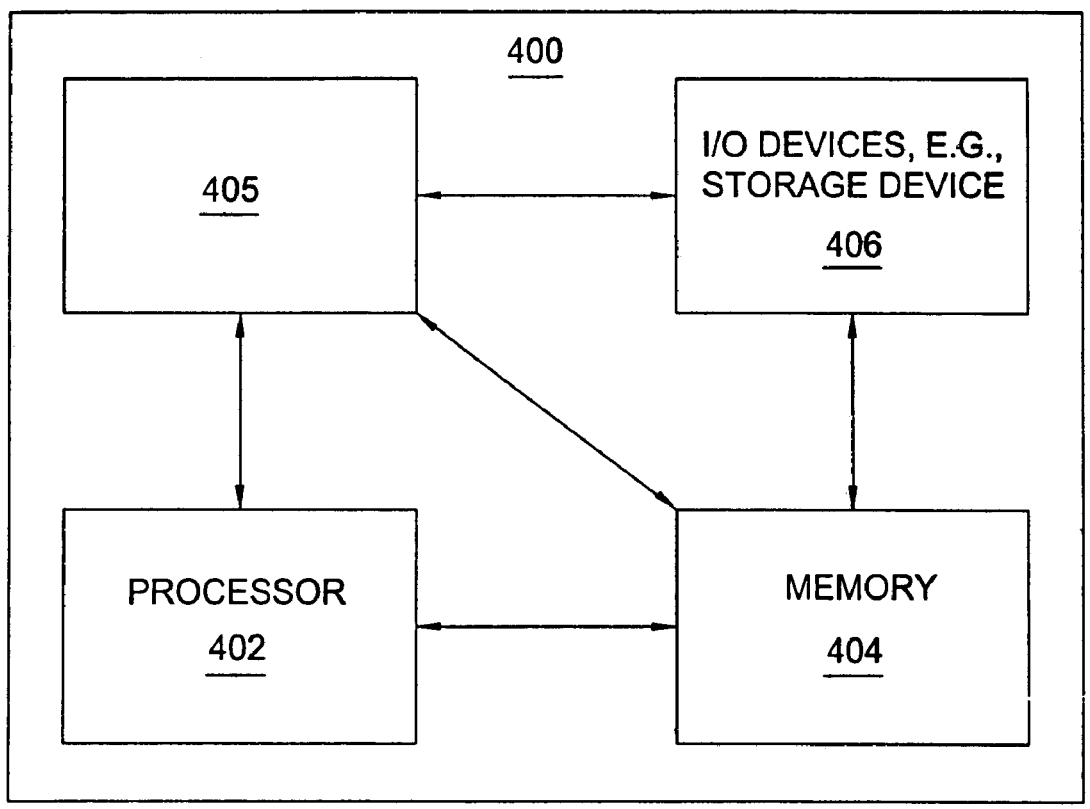
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an electrical interference detection and correction module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present electrical interference detection and correction module or process 405 can be loaded into memory 404 and executed by processor 402 to implement the functions as discussed above. As such, the present electrical interference detection and correction process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting and correcting an electrical interference in a conference call in a communication network, comprising:

detecting said electrical interference in said conference call;

determining whether said electrical interference has exceeded a preset interference threshold level; and interrupting said conference call to present an announcement if said preset interference threshold level has been exceeded, wherein said interrupting comprises:

raising and sending an electrical interference alarm to a call control element (CCE);

sending a network announcement regarding said electrical interference alarm to a conference bridge operator; and interrupting said conference call by said conference bridge operator.

2. A computer-readable medium having stored thereon a plurality of instructions, the plurality of instructions including instructions which, when executed by a processor, cause the processor to perform steps of a method for detecting and correcting an electrical interference in a conference call in a communication network, comprising:

detecting said electrical interference in said conference call;

determining whether said electrical interference has exceeded a preset interference threshold level; and interrupting said conference call to present an announcement if said preset interference threshold level has been exceeded, wherein said interrupting comprises:

raising and sending an electrical interference alarm to a call control element (CCE);

sending a network announcement regarding said electrical interference alarm to a conference bridge operator; and interrupting said conference call by said conference bridge operator.

3. An apparatus for detecting and correcting an electrical interference in a conference call in a communication network, comprising:

means for detecting said electrical interference in said conference call;

means for determining whether said electrical interference has exceeded a preset interference threshold level; and means for interrupting said conference call to present an announcement if said preset interference threshold level has been exceeded, wherein said interrupting means comprises:

means for raising and sending an electrical interference alarm to a call control element (CCE); and means for directly interrupting said conference call to present said announcement, where said announcement is an automated announcement.

* * * * *